(12) United States Patent
Wirtz et al.

(10) Patent No.: US 11,598,734 B2
(45) Date of Patent: Mar. 7, 2023

(54) JOINT NANOSCALE THREE-DIMENSIONAL IMAGING AND CHEMICAL ANALYSIS

(71) Applicant: LUXEMBOURG INSTITUTE OF SCIENCE AND TECHNOLOGY (LIST), Esch-sur-Alzette (LU)

(72) Inventors: Tom Wirtz, Grevenmacher (LU); Florian Vollnhals, Erlangen (DE)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 0 days.

(21) Appl. No.: 17/057,961

(22) PCT Filed: May 31, 2019

(86) PCT No.: PCT/EP2019/064177
§ 371 (c)(1),
(2) Date: Nov. 23, 2020

(87) PCT Pub. No.: WO2019/229233
PCT Pub. Date: Dec. 5, 2019

(65) Prior Publication Data
US 2021/0302338 A1    Sep. 30, 2021

(30) Foreign Application Priority Data
May 30, 2018  (LU) .................................. 100806

(51) Int. Cl.
*G01N 23/225* (2018.01)
*G01N 23/2251* (2018.01)
(Continued)

(52) U.S. Cl.
CPC ..... *G01N 23/2251* (2013.01); *G01N 23/2258* (2013.01); *H01J 49/0004* (2013.01)

(58) Field of Classification Search
CPC ............ G01N 23/2251; G01N 23/2258; H01J 49/0004; H01J 2237/226; H01J 2237/2611; H01J 2237/2527
See application file for complete search history.

(56) References Cited

U.S. PATENT DOCUMENTS 4,596,929 A * 6/1986 Coates .................. H01J 37/244
250/397
9,378,923 B2 * 6/2016 Schwarzband ...... G01D 18/008
(Continued)

FOREIGN PATENT DOCUMENTS

JP    H01-296552 A    11/1989

OTHER PUBLICATIONS

Eulitz, Mona, and Gebhard Reiss. "3D reconstruction of SEM images by use of optical photogrammetry software." Journal of structural biology 191.2 (2015): 190-196. (Year: 2015).*
(Continued)

*Primary Examiner* — Wyatt A Stoffa
(74) *Attorney, Agent, or Firm* — Rankin, Hill & Clark LLP

(57) ABSTRACT

A method for in-situ joint nanoscale three-dimensional imaging and chemical analysis of a sample. A single charged particle beam device is used for generating a sequence of two-dimensional nanoscale images of the sample, and for sputtering secondary ions from the sample, which are analysed using a secondary ion mass spectrometry device. The two-dimensional images are combined into a three-dimensional volume representation of the sample, the data of which is combined with the results of the chemical analysis.

15 Claims, 5 Drawing Sheets

(51) Int. Cl.
*G01N 23/2258* (2018.01)
*H01J 49/00* (2006.01)

(56) References Cited

U.S. PATENT DOCUMENTS

| | | | | |
|---|---|---|---|---|
| 9,464,995 | B2* | 10/2016 | Edelmann | G02B 21/34 |
| 9,659,743 | B2* | 5/2017 | Kim | H01J 37/31 |
| 9,766,224 | B2* | 9/2017 | Nolan | G01N 33/5008 |
| 10,043,274 | B2* | 8/2018 | Varslot | G01N 23/2251 |
| 11,047,869 | B2* | 6/2021 | Cooks | G01N 33/92 |
| 11,313,878 | B2* | 4/2022 | Ovchinnikova | G01N 23/06 |
| 2014/0291512 | A1 | 10/2014 | Nakatani et al. | |
| 2018/0269046 | A1* | 9/2018 | Moellers | H01J 49/107 |
| 2021/0035299 | A1* | 2/2021 | Ikegami | H01J 49/004 |
| 2021/0109046 | A1* | 4/2021 | Lewis | G01N 27/61 |

OTHER PUBLICATIONS

International Search Report dated Aug. 21, 2019, PCT/EP2019/064177, 5 pages.

Dowsett, et al., "Co-Registered In Situ Secondary Electron and Mass Spectral Imaging on the Helium Ion Microscope Demonstrated Using Lithium Titanate and Magnesium Oxide Nanoparticles", Analytical Chemistry, vol. 89, No. 17, Aug. 3, 2017, 10 pages.

Eulitz, et al., "3D Reconstruction of SEM Images by Use of Optical Photogrammetry Software", Journal of Structural Biology, vol. 191, No. 2, Jun. 11, 2015, 8 pages.

Ishitani, et al., "Objective Comparison of Scanning Ion and Scanning Electron Microscope Images", Scanning, vol. 19, No. 7, Dec. 1, 1997, 9 pages.

Wirtz, et al., "Design and Performance of a Combined Secondary Ion Mass Spectrometry-Scanning Probe Microscopy Instrument for High Sensitivity and High-Resolution Elemental Three-Dimensional Analysis", Review of Scientific Instruments, Melville, NY, US, vol. 83, No. 6, Jun. 1, 2012, 10 pages.

Egerton, et al., "Basic Questions Related to Electron-Induced Sputtering in the TEM", Ultramicroscopy, Elsevier, Amsterdam, NL, vol. 110, No. 8, Jul. 1, 2010, 7 pages.

Zaluzec, et al., "Electron Sputtering in the Analytical Electron Microscope: Calculations & Experimental Data", Electron Microscopy Center for Materials Research, Materials Science Division, Argonne National Laboratory, May 26, 1987, 16 pages.

Vollnhals, et al., "Correlative Microscopy in 3D: Helium Ion Microscopy-Based Photogrammetric Topography Reconstruction Combined with In Situ Secondary Ion Mass Spectrometry", Analytical Chemistry, vol. 90, No. 20, Oct. 16, 2018, 8 pages.

Sterling, et al., "New Perspectives on Nano-Engineering by Secondary Electron Spectroscopy in the Helium Ion and Scanning Electron Microscope", MRS Communications, vol. 8, No. 02, Apr. 23, 2018, 28 pages.

Dunn, et al., "Quantitative Three-Dimensional Reconstruction of Geometrically Complex Structures with Nanoscale Resolution", Review of Scientific Instruments, Melville, NY, US, vol. 73, No. 2, 6 pages.

* cited by examiner

JOINT NANOSCALE THREE-DIMENSIONAL IMAGING AND CHEMICAL ANALYSIS

TECHNICAL FIELD

The invention lies in the field of nanoscale imaging and chemical analysis of sample. In particular, the invention concerns a method combining secondary ion mass spectrometry and three-dimensional imaging based on secondary electron detection.

BACKGROUND OF THE INVENTION

Secondary Ion Mass Spectrometry, SIMS, devices are used for analytical and imaging purposes in various scientific fields, including biology, geology or nanotechnology. In known SIMS devices, a focused primary ion beam is used to illuminate the surface of a sample. Thereby, material is sputtered from the sample, which creates localised secondary ion emissions stemming from the sample. These secondary ions can be analysed by different kinds of spectrometers. Generally, the secondary ions are first filtered in accordance with their mass-to-charge ratio, and then detected, to yield mass spectra or distribution maps ("images").

The investigation of nanoscale objects is of increasing importance in the life and materials science. This includes both structural aspects like topography, ordering, connectivity and so forth, and chemical or physical properties of a sample, e.g., chemical composition, dopant or trace element concentration, optical properties, fluorescence, magnetism, work function and many more.

In many cases it is not possible to investigate such properties on the length scales of the structures themselves due to technical or physical limitations of the applied analytical techniques. On the other hand, dedicated microscopy techniques like scanning or transmission electron microscopy, SEM/TEM, atomic force microscopy, AFM, or scanning tunneling microscopy, STM, provide means to investigate these structural aspects at high resolution, but these techniques may be limited in their analytical capabilities of the non-structural aspects.

It has therefore been suggested to combine the results obtained from a multitude of different microscopic and spectro-microscopic techniques and perform what is commonly referred to as correlative microscopy to gain a deeper understanding of the sample and its properties. Typical combinations of techniques are light or fluorescence microscopy and SEM/TEM (correlative light/electron microscopy, CLEM or CEM) or secondary ion mass spectrometry, SIMS, and SEM/TEM. While the latter combination is beneficial for dedicated, carefully prepared samples, e.g., thin section of tissue, SIMS-based imaging and depth profiling of pristine, non-flat specimen can be challenging to evaluate and understand due to the influence of the topography on sputter yields and secondary ion extraction efficiencies. This is especially true if conventional known SIMS 3D reconstruction techniques are used to recreate a 3D structure. Such a known 3D reconstruction is achieved by stacking consecutively acquired 2D SIMS images and assigning them an arbitrary thickness based mostly on educated guesses or reference data, e.g., sputter yields. This reconstruction yields a 3D cuboid, comprised of voxels of identical dimensions in a regular lattice. While this approach is reasonable for flat, uniform samples like multilayer stacks, it fails for samples that exhibit pronounced non-flat topography.

In order to remedy this situation, knowledge of the topography of the investigated surface can be included into the reconstruction. In this context, is has been suggested to combine SIMS data with topographical information obtained by atomic force microscopy, AFM, or related scanning probe microscopy, SPM, techniques. It has been shown that such a reconstruction of 3D SIMS data using AFM z-information is superior to the conventional voxel-lattice approach, see for example Fleming, Y.; Wirtz, T "Beilstein Journal of Nanotechnology 2015, DOI: 10.3762/bjnano.6.110".

The major drawback of using an AFM for this step is the need for either i) ex-situ analysis in a stand-alone AFM, which limits the flexibility of the analysis, which may introduce contaminations, and which poses challenges to locate the regions of interest on the sample, or ii) in-situ AFM capabilities, which are limited to prototype instruments at this time, see for example T. Wirtz, Y. Fleming, M. Gerard, U. Gysin, Th. Glatzel, E. Meyer, U. Wegmann, U. Maier, A Herrero Odriozola, D. Uehli Rev. Sci. Instrum. 83 (2012) 063702-1-063702-9.

There are alternative approaches to the evaluation of sample topography based on Scanning Electron Microscopy, SEM. In scanning electron microscopy, SEM, a focused primary electron beam is used to illuminate the surface of a sample. Thereby, secondary electrons are emitted from the sample, which are collected and guided to a detector, whereby an image representation of the corresponding surface area is obtained. The most common approaches to the evaluation of sample topography by SEM are to tilt the sample with respect to the primary electron beam axis and to perform a calculation of the surface topography via triangulation of points of interest, or to use multiple detectors during a single exposure. Recently, a related methodology for 3D reconstruction via SEM was introduced by Eulitz et al. This approach extends the use of well-developed algorithms for photogrammetric 3D reconstructions, P3D, i.e., the reconstruction of three-dimensional models from a series of photographic images, to the realm of scanning electron microscopy.

Photogrammetric 3D has been used for example to create physical copies of objects by combining the 3D-Scan with additive manufacturing, also known as 3D-printing. Several algorithms and software packages have been developed for this task; an introduction and further references can be found for example in Eulitz, M.; Reiss, G. "Journal of Structural Biology 2015, DOI: 10.1016/1jsb.2015.06.010". For P3D, multiple images of an object are captured from many different angles. After registration and analysis, certain features in the images are cross-referenced to find point coordinates and finally to create a three-dimensional model of the object. In SEM-based P3D, instead of moving a camera around a fixed object, the object is placed into a eucentric position, where it remains stationary under rotation and tilt.

Similar to the known AFM-SIMS approach, the known use of SEM data for the 3D-reconstruction requires ex-situ analysis in a dedicated instrument, with all the associated drawbacks.

In conclusion, the chemical or elemental analysis of samples with complex surface topography remains challenging for SIMS techniques if the three-dimensional structure of the sample is not taken into account. Conventional 3D reconstruction of SIMS data assumes a flat surface and uniform sputtering conditions, which is not the case for many analytical applications involving micro- and nano-sized particles, composites or patterned materials. Reliable analysis of such samples requires knowledge of the actual 3D surface structure to correctly reconstruct the SIMS 3D maps, but problems prevail with known methods for obtaining this knowledge.

Technical Problem to be Solved

It is an objective of the invention to present a method, which overcomes at least some of the disadvantages of the prior art. In particular, it is an objective of the invention to present a method for joint in-situ nanoscale 3D-imaging and chemical analysis, as well as a corresponding device.

SUMMARY OF THE INVENTION

According to a first aspect of the invention, a method for joint 3D imaging and chemical analysis of a sample is provided. The method comprises the following steps:
a) obtaining, using imaging means based on secondary electron, SE, detection, a sequence of two-dimensional images of said sample, the images of said sequence being taken from different viewing angles, and combining said two-dimensional images into a three-dimensional representation of the sample using image processing means;
b) obtaining, using secondary ion mass spectrometry, SIMS, means a representation of the chemical composition of said sample;
c) mapping, using data processing means, the representation of the chemical composition to said three-dimensional representation of the sample and recording the result in a memory element.

The method is remarkable in that steps a) and b) are performed in-situ within the same device.

According to another aspect of the invention, a method for joint 3D imaging and chemical analysis of a sample is provided. The method comprises the following steps:
a) obtaining, using imaging means based on secondary electron, SE, detection, a sequence of two-dimensional images of said sample, the images of said sequence being taken from different viewing angles, and combining said two-dimensional images into a three-dimensional representation of the sample using image processing means comprising photogrammetry means;
b) obtaining, using secondary ion mass spectrometry, SIMS, means a representation of the chemical composition of said sample;
c) mapping, using data processing means, the representation of the chemical composition to said three-dimensional representation of the sample and recording the result in a memory element.

The method is remarkable in that steps a) and b) are performed in-situ within the same device.

Preferably a single representation of the chemical composition of said sample may be obtained.

Preferably said three dimensional representation may be a representation of the sample's surface.

Preferably, during said secondary electron, SE, imaging step a), the sample may be irradiated using a first primary charged particle beam for taking a two-dimensional image, thereby releasing secondary electrons from the sample. Further, during said SIMS analysis step b), the sample is irradiated using a second primary charged particle beam, thereby releasing secondary ions from the sample.

The first and second primary charged particle beams may preferably be ion beams. It may be preferred that the first primary ion beam is an $He^+$ beam, and that the second primary ion beam is an $Ne^+$ beam.

The first and second primary charged particle beams may preferably be electron beams.

It may be preferred that the first primary charged particle beam is an electron beam and the second primary charged particle beam is an ion beam.

Preferably, the first primary charged particle beam may be an ion beam and the second primary charged particle beam may be an electron beam.

The image processing means may preferably comprise photogrammetry means.

During said SE imaging step a), the relative position of said sample with respect to said SE detection/imaging means may preferably be changed.

Preferably, the position may be changed by changing the orientation of the sample with respect to the SE detection/imaging means.

Step a) may preferably be performed prior to step b), or vice-versa.

According to another aspect of the invention, a device for performing joint 3D in-situ imaging and chemical analysis of a sample is provided. The device comprises a sample holder, imaging means based on secondary electron, SE, detection, and secondary ion mass spectrometry, SIMS, means. The device further comprises a data processor configured for:
combining, using a method of photogrammetry, a sequence of two-dimensional images of a sample obtained using said imaging means into a three-dimensional representation of the sample, and for
mapping a representation of the chemical composition obtained using said SIMS means to said three-dimensional representation of the sample.

The data processing means or image processing means/ photogrammetry means may preferably comprise a central processing unit, CPU, of a computing device, configured through appropriate software code to implement the mentioned processing steps in accordance with aspects of the invention.

The device may preferably comprise first primary beam generation means for generating a first primary charged particle beam and second primary beam generation means for generating a second primary charged particle beam. The first and second primary beam generation means may preferably comprise an electron or an ion source and associated electron and/or ion columns.

The first and second primary beam generation means may preferably comprise and share the same ion source. Further, it may be preferred that the first and second primary beam generation means comprise and share the same primary ion column.

Preferably, the ion source may comprise a gas field ion source.

The sample holder may preferably comprise a rotatable stage for rotating a sample with respect to the emission axis of said first and/or second primary beam generation means.

The method provides the possibility to generate a three-dimensional model of almost any 3D structure in a single instrument without the need for sample exchange, ex-situ processing or additional instrumentation. In preferred embodiments, this is achieved using a single charged particle column, such as in an Helium Ion Microscope, HIM. This opens up a number of potential applications both for FIB and SIMS applications.

Photogrammetric reconstruction of three-dimensional specimen provides a promising technique for sample characterization. The possibility to acquire a 3D model of a particular structure, for example during HIM analysis without the need for ex-situ analysis or additional instrumentation broadens the scope of applications considerably. The combination with secondary ion mass spectrometry allows for correlative HIM-SIMS microscopy in 3D, and more elaborate corrections and post-processing for 2D applications. Furthermore, it opens the horizon for advanced analysis and machining, as prior knowledge of the sample topography can be incorporated into the workflow and can help to prevent unwanted sample damage and reduce the impact of topography during analysis.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes the invention in further detail based on preferred embodiments and on the figures. Similar reference numbers will be used to describe similar or the same concepts throughout different embodiments of the invention. For example, references 100 and 200 respectively denote two different embodiments of a device for performing the method in accordance with aspects of the invention.

It should be noted that features described for a specific embodiment described herein may be combined with the features of other embodiments unless the contrary is explicitly mentioned. Features commonly known in the art will not be explicitly mentioned for the sake of focusing on the features that are specific to the invention. For example, the device for joint 3D imaging and chemical analysis in accordance with some aspects of the invention is evidently powered by an electric supply, even though such supply is not explicitly referenced on the figures nor referred to in the description.

Figure 1:
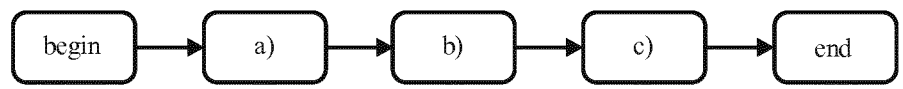
FIG. 1 illustrates the main method steps of the method in accordance with a preferred embodiment of the invention.

FIG. 1 illustrates the main steps of a method in accordance with a first preferred embodiment of the present invention. In a first step a), a sequence of two-dimensional images of a sample is obtained. The images are preferably of nanoscale resolution. They are obtained using imaging means based on secondary electron, SE, detection, and the images of the sequence are taken from different viewing angles. The imaging means typically comprise a secondary electron microscope and a corresponding detector. Preferably, subsequent images within the sequence represent partially overlapping fields of view. The images of the sequence are stored in a memory element for further processing by an image processor, which implements a method of photogrammetry. Thereby, the two-dimensional images of the sequence are combined into a three-dimensional representation of the sample's surface, which is in turn stored in a memory element. The memory element may for example be a hard disk drive, solid state drive, or any known digital storage medium, to which the processor has read/write access. Photogrammetry is a well known technique, which has been described for example in Eulitz, M.; Reiss, G. "*Journal of Structural Biology* 2015, DOI: 10.1016/1jsb.2015.06.010", which is hereby incorporated by reference in its entirety.

Figure 2:
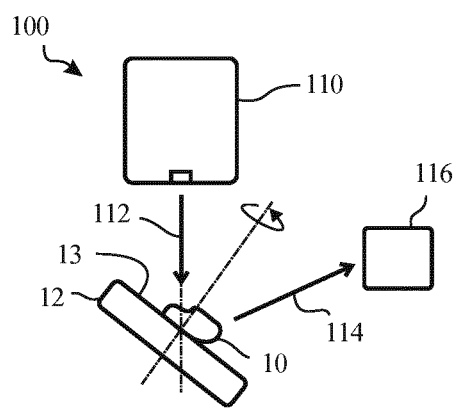
FIG. 2 is a schematic partial view of a device for performing the method in accordance with a preferred embodiment of the invention.

FIG. 2 illustrates by way of example a snapshot of a setup 100 for implementing step a) as describe here above. For obtaining an image of the sequence, the sample 10 is irradiated using a first primary charged particle beam 112, generated by a first primary charged particle beam generator 110. The beam 112 scans at least a part of the sample's surface, whereby the incident beam and loosely bound orbital shell electrons of the sample eject secondary electrons 114, SE, which can be drawn in by a detector 116. The detector 116 may for example be of the Everhart-Thornley type, wherein the detector is positively biased, and wherein the secondary electrons are converted into photons, amplified in a photomultiplier and converted to an electrical signal. Other detectors may be used, including but not limited to a channeltron or a microchannelplate, MCP. The secondary electron signal has the advantage of providing high-resolution surface topography since their low energy permits only near-surface interaction with the specimen. In an SE image, the brightness of a given pixel correlates to the sum of the detected secondary electrons emitted from the corresponding beam location on the surface of the specimen. The SE image is thus a map of the scanned surface area of the sample, formed by the variation in SE emission as the beam is scanned over the surface, where surface protrusions and features angled toward the detector produce an enhanced SE yield.

In order to obtain images from different viewing angles, the sample 10, which is held by a sample holder 12 having a plane surface 13, is tilted using a stage with respect to the primary beam direction 112 and rotated around an axis normal to said sample holder's plane surface 13. For each image of the sequence, the rotation angle of the sample holder 12 is changed by a control unit which is not illustrated. Both the tilt angle and rotation angle may be stored together with the captured image data.

Figure 3:
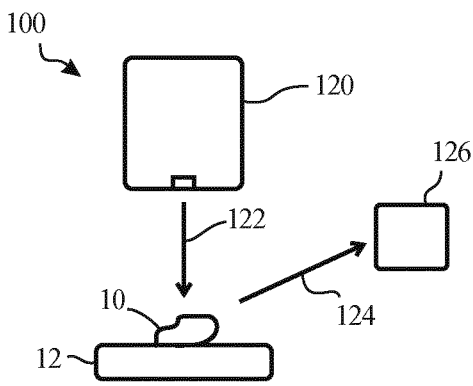
FIG. 3 is a schematic partial view of a device for performing the method in accordance with a preferred embodiment of the invention.

Step b) as shown in FIG. 1 proceeds with obtaining a representation of the chemical composition of the sample. FIG. 3 illustrates by way of example a snapshot of a setup 100 for implementing step b). The representation of the chemical composition is obtained using a secondary ion mass spectrometer, SIMS, device. The sample 10 is irradiated using a second primary charged particle beam 122, generated by a second primary charged particle beam generator 120. The second primary beam 122 strikes the sample 10 with any incidence angle ranging from normal incidence, as shown in FIG. 3, to grazing incidence. The primary charged particles generate various phenomena on sample surface, and particularly they eject surface atoms as neutrals or ions. As a consequence, the primary beam 122 gradually digs a crater at the sample surface, and secondary ions 124 originating from the sample 10 are emitted. The SIMS device 126 collects those secondary ions by appropriate collection means, which comprise for example a system using electrodes configured for generating an electromagnetic field, which accelerates and/or guides the secondary ions into a preferred direction, e.g., towards the device's mass filtering or analysing means. Indeed, the SIMS device 126 furthermore comprises analysing means for filtering them in accordance with their mass-to-charge ratio, and imaging/detection means for visualising and counting the filtered secondary ions. The detection means may be any such means known in the art, comprising for example a Faraday Cup, an electron multiplier, channel electron multiplier, a microchannelplate, MCP, coupled to fluorescent screen and charge coupled device, CCD, camera, or an MCP coupled to anode readout, such as a resistive anode encoder or delay line encoder. The collection, filtering and detecting means make up a secondary ion column. Such a secondary ion column can be designed in such a way that it has a stigmatic property. Several architectures are known in the art for realising the mass filtering means of the secondary ion column. These include for example time-of-flight systems or double-focusing magnetic sector spectrometers comprising an electrostatic sector followed on the secondary ion trajectory by a magnetic sector. The functioning of these well-known mass filtering architectures is not described in details in the context of the present invention.

Figure 4:
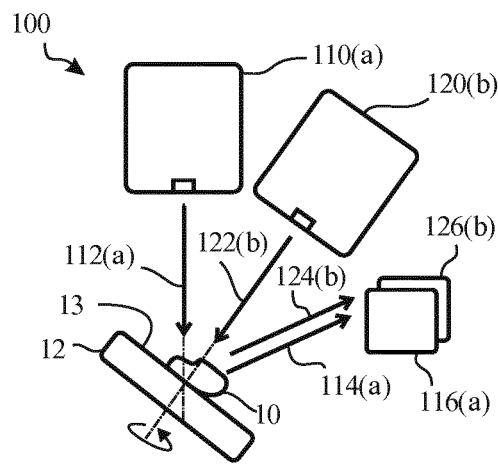
FIG. 4 is a schematic view of a device for performing the method in accordance with a preferred embodiment of the invention.

As shown in FIG. 4, both first and second primary charged particle beam generation means 110, 120 are part of the same device 100, so that both steps a) and b) are performed in situ. In the final step c), both the representation of the chemical composition and the generated three-dimensional representation of the sample 10 are mapped onto the corresponding locations and recorded in a memory element.

In accordance with a second preferred embodiment of the invention, the architecture 100 as shown in FIG. 4 comprises a first primary electron beam generator 110 for implementing step a) and a second primary ion beam generator 120 for implementing step b). The orientation of the sample 10, and the electric potential bias applied to it, is altered between steps a) and b). In accordance with the second embodiment, the first step a) is an implementation of scanning electron microscopy, SEM. SEM produces high-resolution micrographs by accelerating an electron beam 112 downward, in a vacuum, within the instrument column through a series of electromagnetic lenses and apertures, which regulate the size and coherency of the beam down to a nanometer-scale focal point. The electron probe scans within a frame a raster line by line over the sample surface via an oscillating magnetic field generated by an electromagnetic coil close to the final lens of the column. Magnification is changed by adjusting the length of the scan lines on the sample. The rastering electron beam 112 creates a volume of primary excitation within the sample which causes the release of the secondary electrons 114. In accordance with this second embodiment, the second step b) is an implementation of SIMS using a primary ion column, including an ion source device. Each primary ion 122 reaches the sample with an energy which typically ranges from 200 eV to 40 keV.

The primary ion source device 120 uses, as in known primary ion source devices, primarily caesium (under the form of $Cs^+$ ions) and oxygen (under the form of $O^-$ or $O_2^+$ ions), but any other ion beams such as $He^+$, $Ne^+$, $Ar^+$, $Xe^+$, etc., can be used equally well.

In accordance with a third preferred embodiment of the invention, the architecture 100 as shown in FIG. 4 comprises a first primary ion beam generator 110 for implementing step a) and a second primary electron generator 120 for implementing step b). For step a), a first primary ion beam 112, typically in the range of 100 eV to 50 keV, irradiates the sample 10, which results in the generation of secondary electrons 114. For step b), a second primary electron beam 114, typically in the range of 1 to 50 keV irradiates the sample 10, whereby secondary ions 124 are sputtered from the sample's surface, which are in turn collected, analysed and detected by the SIMS device 126.

Figure 5:
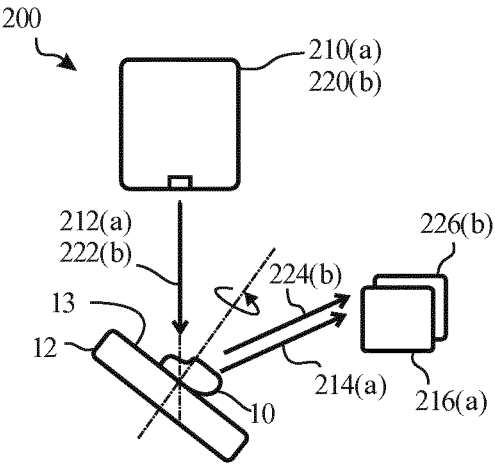
FIG. 5 is a schematic view of a device for performing the method in accordance with a preferred embodiment of the invention.

FIG. 5 shows an alternative architecture 200 for implementing the method for in-situ joint 3D imaging and chemical analysis in accordance with aspects of the present invention. The device 200 comprises a single charged particle generator 210, 220, which is configured for generating a beam 212 suitable for SE imaging implementing step a), and for generating a beam 222 suitable for SIMS analysis implementing step b). Using a single beam generator/column provides the advantage of reducing the complexity, scale and production cost of the device, as compared to using a dedicated beam generator/column for the steps of 3D imaging and chemical analysis respectively.

In accordance with a fourth preferred embodiment of the invention, the architecture 200 as shown in FIG. 5 comprises a single primary electron beam generator 210, 220. In accordance with the fourth embodiment, the first step a) is an implementation of scanning electron microscopy, SEM. The rastering electron beam 212 creates a volume of primary excitation within the sample which causes the release of the secondary electrons 214, which are detected and imaged by the detector 226. In accordance with this fourth embodiment, the second step b) is an implementation of SIMS using a primary electron column. An electron beam 214 irradiates the sample 10, whereby secondary ions 224 are sputtered from the sample's surface, which are in turn collected, analysed and detected by the SIMS device 226.

In accordance with a fifth, and most preferred embodiment of the invention, the architecture 200 as shown in FIG. 5 comprises a single primary ion beam generator 210, 220. For step a), a first primary ion beam 212 irradiates the sample 10, which results in the generation of secondary electrons 224. The secondary electrons are detected and imaged by the detector 226. In accordance with this fifth embodiment, the second step b) is an implementation of SIMS using a primary ion column. A second primary ion beam 214 irradiates the sample 10, whereby secondary ions 224 are sputtered from the sample's surface, which are in turn collected, analysed and detected by the SIMS device 226. The first and second primary ion beams 212, 214 may be the similar, i.e., they may comprise the same ion species, same energy and ion mass, or they may alternatively comprise two different ion species. Preferably, the first primary ion beam may be a beam comprising $He^+$ ions and the second primary ion beam may be a beam comprising $Ne^+$ ions. The architecture 200 may therefore comprise an ion column that is similar to an ion column comprised in an HIM device.

In all of the embodiments, step b) may alternatively be performed prior to step a). However, performing step b) first generally results in a degradation of the sample's surface due to the destructive nature of secondary ion sputtering that is required for the chemical analysis using a SIMS device.

In what follows a description of an experimental setup will be given, which conforms to the fifth embodiment as described here above, i.e., in which a single ion column is used for implementing both steps a) and b) of the method.

Experimental Setup

In this embodiment, the in-situ approach to 3D-SIMS in accordance with aspects of the invention is illustrated. The embodiment makes use of the unique capabilities of the Helium ion microscope, HIM, in the form of the Zeiss ORION NanoFab™. The Zeiss NanoFab™ Helium/Neon Ion Microscope is a high resolution scanning ion microscope that allows for structural analysis and manipulation on the nanometer scale by Helium Ion Microscopy, HIM. Using an appropriate mass analyzer, the device enables the investigation of chemical aspects of a specimen via SIMS with an high spatial resolution, as recently demonstrated in the field of solar cells, see for example Wirtz, T. et al., "*SIMS on the Helium Ion Microscope*" in *Helium Ion Microscopy*; Hlawacek, Gregor; Gölzhäuser, Armin, Eds.; Springer International Publishing: Cham, 2016.

This unique combination of instrumental techniques is therefore perfectly suited for a combination of, on the one hand, the aforementioned 3D surface reconstruction extracted from secondary electron detection and, on the other hand, chemical mapping or depth profiling by secondary ion microscopy. The viability of this in-situ approach using one single sample probing beam to correlative 3D SIMS is investigated in the following.

An ORION NanoFab™ was used for Helium ion microscopy and, in combination with a mass analyzer for secondary ion mass spectrometry. Details on the microscope and spectrometer are known in the art and will not be discussed in detail in the context of this invention. High-resolution secondary electron data for the P3D process was acquired using $He^+$ as primary ion species to avoid sample damage. The beam current was set to 1.3-1.7 pA at an energy of 12.5 to 12.8 keV for the InP particle sample. This results in imaging doses of less than $2\times10^{14}$ ions/cm$^2$ per micrograph, for a total imaging dose of less than $1\times10^{16}$ ions/cm$^2$. As the NanoFab was not equipped with a dedicated system for eucentric rotation under tilted conditions, the region of interest was manually positioned in the center of the image frame between rotation steps. $Ne^+$ primary ions (25 keV, 4-5 pA) were used for mass spectrometry and imaging SIMS in positive secondary ion mode. The stage tilt was set to 0° in this case, i.e., the primary ion beam was perpendicular to the sample surface. A single imaging SIMS dataset, comprising of up to four, simultaneously sampled mass channels, corresponds to an ion dose of approx. $1.5\times10^{15}$ ions/cm$^2$. The total $Ne^+$ ion dose during setup and SIMS data acquisition was estimated to be less than $10^{17}$ ions/cm$^2$.

Figure 6:
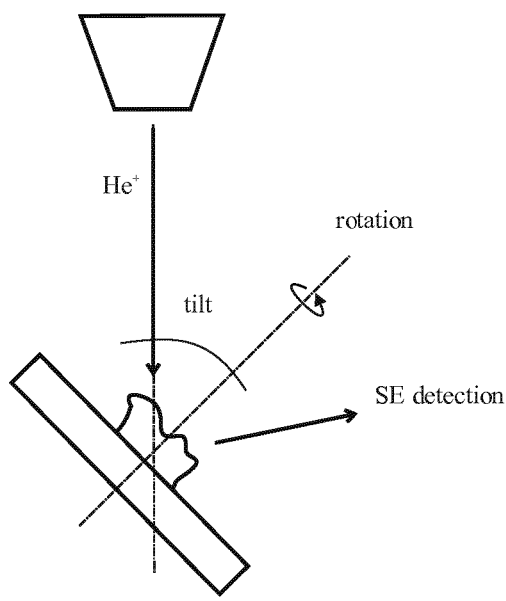
FIG. 6 is a schematic view of a device for performing the method in accordance with a preferred embodiment of the invention.

FIG. 6 illustrates the image acquisition for photogrammetric 3D reconstruction in the Helium Ion Microscope. Instead of rotating a camera around a given object to acquire the data set for reconstruction, the sample is rotated at a given stage tilt (e.g., 30°, 45°, 54°, . . . ), so that the object of interest is located at the intersection of the beam axis and sample holder normal (i.e., the rotational axis). For each rotation step of, e.g., 15°, an image is recorded and added to the data set. In order to improve the reconstruction, multiple tilt angle series may be required.

Atomic force microscopy data for comparative purposes was captured with an Agilent 5100™ AFM using standard beam type cantilevers (Nanosensors PPP-NCHR™) in acoustic AC mode.

The SIMS and image data was analyzed using ImageJ in the form of the Fiji distribution. AFM data was evaluated using Gwyddion. Autodesk ReMake™ was used for photogrammetric 3D reconstruction and the data was visualized using the Paraview software package.

For the cell sample, differentiated THP1 cells were grown on wafer silicon, and fixed in 2% glutaraldehyde in PBS for 30 min. The samples were post fixed with 1% $OsO_4$ for 1 h at 4° C. They were washed 3 times with PBS and thereafter they were dehydrated with ethanol concentrations (30, 50, 70, 90 and 100%×2 ethanol). Samples were dried in air before being coated with a thin platinum layer.

The InP wafer sample (Wafer Technology Ltd, Milton Keynes, UK) was used without further treatment after mechanical cleaving in ambient conditions.

Photogrammetric 3D (P3D) from HIM Micrographs

The applicability of the photogrammetric 3D (P3D) reconstruction from SEM images was discussed e.g. by Eulitz and Reiss. Helium ion microscopy operates on a very similar imaging principle to SEM: a focused beam of charged particles (electrons in the case of SEM, $He^+$ or $Ne^+$ ions in the case of HIM) is directed onto a sample, interacts with the material and causes the emission of low-energy secondary electrons (among other interaction products), which are detected by a suitable detector.

While the details of image formation may vary, the resulting micrographs are similar in appearance and should therefore be suitable for P3D.

Figure 7:
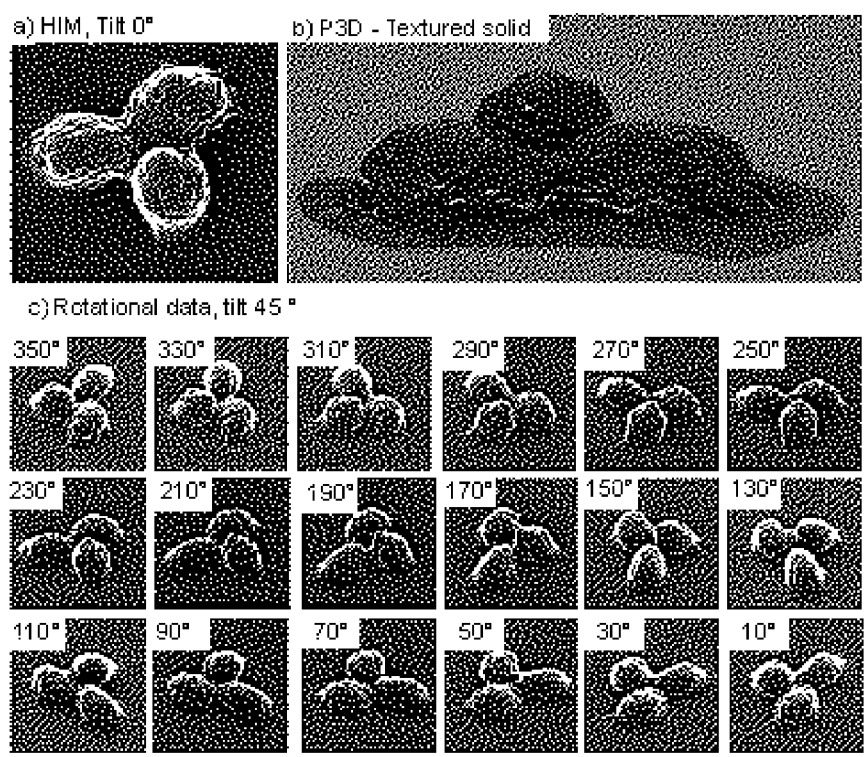
FIG. 7 shows results obtained using an embodiment of the method in accordance with the invention.

FIG. 7 illustrates the reconstruction of a cell group from a sample of differentiated THP1 cells using Helium ion microscopy. The sample was sputter-coated with a thin layer of Pt: a) Top-down view of the sample, tilt angle 0°; b) Reconstruction of the specimen via Autodesk ReMake™ (textured solid); c) rotational series of acquired micrographs (20° steps) at a tilt angle of 45°.

This assumption was tested using a platinum-covered cell colony sample (differentiated THP1) deposited on a silicon wafer. An isolated group of three cells was selected and imaged at a stage tilt of 0°, i.e., the primary beam axis coincides with the surface normal of the wafer (FIG. 7a). The data set for P3D was then recorded at a stage tilt of 45° by rotating the sample in 20° increments around the surface normal (c.f., FIG. 6). The data set is shown in FIG. 7c).

The P3D reconstruction of the cell group was achieved using the free online version of the ReMake™ software package. The reconstruction yields both a three-dimensional model of the object topography (the "solid") as well as the corresponding image of the surface (the "texture").

FIG. 7b) shows a side-on view of the model with the applied texture ("textured solid"). It is apparent that the 3D structure of the cell group is captured in the P3D model, leading to the conclusion that P3D reconstruction is indeed a viable route for the in-situ analysis of surface topography in HIM without the need for additional instrumentation.

Comparison of P3D from HIM Micrographs and AFM

Figure 8:
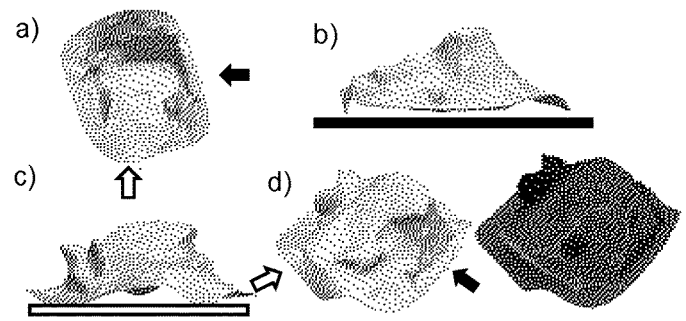
FIG. 8 shows results obtained using an embodiment of the method in accordance with the invention.

An InP particle on an InP wafer was used as sample for the evaluation of the reconstruction quality as well as subsequent analysis, as it provided a complex surface topography as well as some variety in the surface composition (dark vs. bright regions indicate differences in chemical composition). The particle was imaged by HIM at tilts of 45° and 54° and rotation increments of 15° and 30°, respectively. The model resulting from the reconstruction is shown in FIG. 8 in the form of the solid (light gray) with artificial shading to accent the topography (a-d) and with the applied texture (d, right part). FIG. 9a is the on-top view, b) and c) are selected side-on views and d) is a perspective projection of the model (left: shaded only, right: textured). The viewing directions are indicated by black and white bars and arrows. In summary, FIG. 8 shows photogrammetric 3D reconstruction (shaded surface) of an InP particle in top view (a), side-on views (b, c) and perspective view (d). The right part of (d) is displayed with the respective texture applied to the model. The arrows indicate the viewing direction of (b) and (c). Notice that vertical and even overhanging sections of the particle are captured in the 3D-model. The undulating boundary of the model is a result of the lack of features of the InP wafer substrate.

Figure 9:
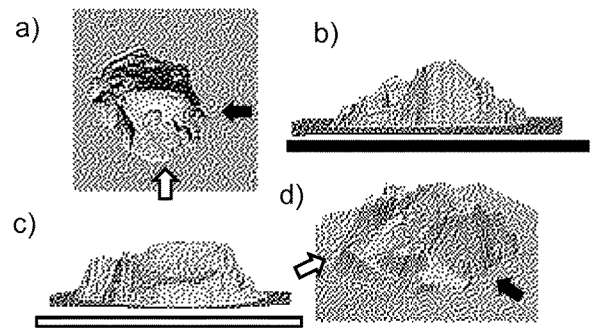
FIG. 9 shows results obtained using AFM-based 3D reconstruction of a particle.

As a control, the same particle was analyzed by AFM (Acoustic mode). The data is presented in FIG. 9 in the form of shaded solid models. FIG. 9 illustrates AFM-based 3D reconstruction (shaded surface) of the InP particle in top view (a), side-on views (b, c) and perspective view (d). Colored arrows indicate viewing direction. Notice that steeply angled as well as overhanging sections of the particle sections are not captured in the model, as the AFM data is actually a convolution of the (macroscopic) tip shape and the investigated sample. The colored arrows in (d) point to regions of featureless, uniform slope, whereas the P3D model in FIG. 8 as well as the respective HIM micrographs indicate overhangs at these position. The selected views correspond to those presented in FIG. 8, with the exception of the textured model. Please note that the AFM data was recorded after a limited amount of He$^+$/Ne$^+$ ion irradiation ($<10^{16}$ He$^+$/cm$^2$, $<10^{17}$Ne$^+$/cm$^2$, see experimental section) on the HIM during the acquisition of SE and SIMS data. This ion irradiation did not significantly alter the shape of the particle, as judged from post-irradiation HIM micrographs.

It is immediately apparent that the AFM model suffers from pronounced artifacts due to the macroscopic shape of the tip. Especially the steep sidewalls of the particle (FIGS. 8a, 9a: black arrow) cannot be imaged due to the convolution of tip shape and surface topography. This kind of artifacts is intrinsic to AFM and cannot be circumvented. Areas of relatively low inclination like the larger sloped section (white arrow) can be imaged at high resolution.

The P3D approach is capable of modeling steep and even overhanging substructures, as it is not limited by the top-down geometry of the AFM. Improved or better adapted algorithms for the reconstruction will likely be able to further improve on the detail level of the reconstruction. The textured P3D model effectively combines the 2D and 3D imaging capabilities of the HIM and thus allows for evaluation of details even at lower "3D fidelity".

Correlation of P3D and SIMS Data Both Obtained on the HIM

The successful application of P3D to HIM data sets in combination with the analytical capabilities of the SIMS analyzer opens up the possibility for correlative microscopy in three dimensions. After the P3D data set is acquired using a low current He ion beam, the NanoFab™ was switched to Neon as a working gas. The spectrometer was set up using a similar particle in close proximity to avoid any disturbance to the target particle during the tuning process. The initial scan of the particle revealed an unexpected $^{40}$Ca signal, most likely a contamination resulting from the sample cleavage in ambient conditions. The distribution of this Ca signal was mapped in the following analysis in addition to the indium signal.

The $^{40}$Ca and $^{115}$In intensities were recorded in the form of SIMS intensity maps. The maps where registered to the on-top view of the P3D model using the manual landmark-based registration in Fiji. The registered maps where then used as textures for the P3D models in Paraview™ to yield the representations shown in FIG. 10. The viewing directions of textured models in FIG. 10 correspond to those in the previous figures.

Figure 10:
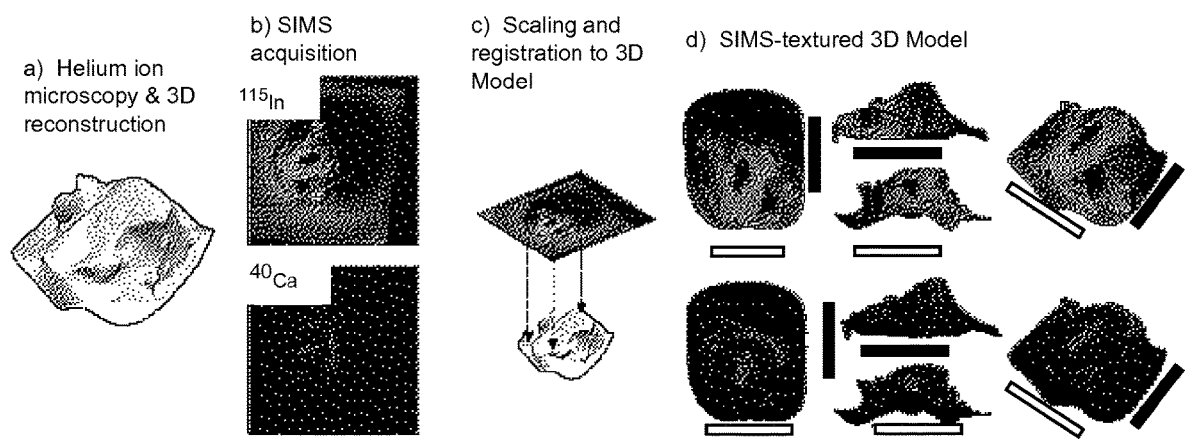
FIG. 10 shows a workflow for 3D SIMS imaging in accordance with embodiments of the invention.

FIG. 10 shows a workflow for 3D SIMS imaging on the HIM: a) Helium ion microscopy and 3D reconstruction from SE images; b) Ne$^+$ SIMS data acquisition yields intensity maps of $^{115}$In (top) and $^{40}$Ca (bottom); c) registration and alignment of SIMS and P3D data sets; d) particle model with applied SIMS intensity maps. The black and white bars indicate the viewing direction (c.f. previous figures). The $^{115}$In is relatively evenly distributed, suggesting that the particle is most likely a fragment of InP wafer. The calcium signal is locally confined to a smaller particle on the main slope and the summit region of the particle, where it locally suppresses the Indium signal. The Calcium is likely due to an impurity covering the InP particle.

The textured models in FIG. 10 show a bimodal distribution of the $^{115}$In and $^{40}$Ca signals. The Indium signal shows a relatively even distribution on the main slope (bottom half of FIGS. 8/9a and 10 top), except for a low-indium region in the middle of the slope, on top of the "ridge" of the particle and for the top-most third of the particle. The $^{40}$Ca is mostly localized in the Indium-free region on the slope and on the ridge the "ridge". The lack of signal intensity for any ion in the top third of the particle will be addressed in the next sections. In summary, the data suggests that the particle is actually a fragment of the InP wafer and covered by localized Ca-containing particles.

Analytical Insights Based on the P3D Model

Figure 11:
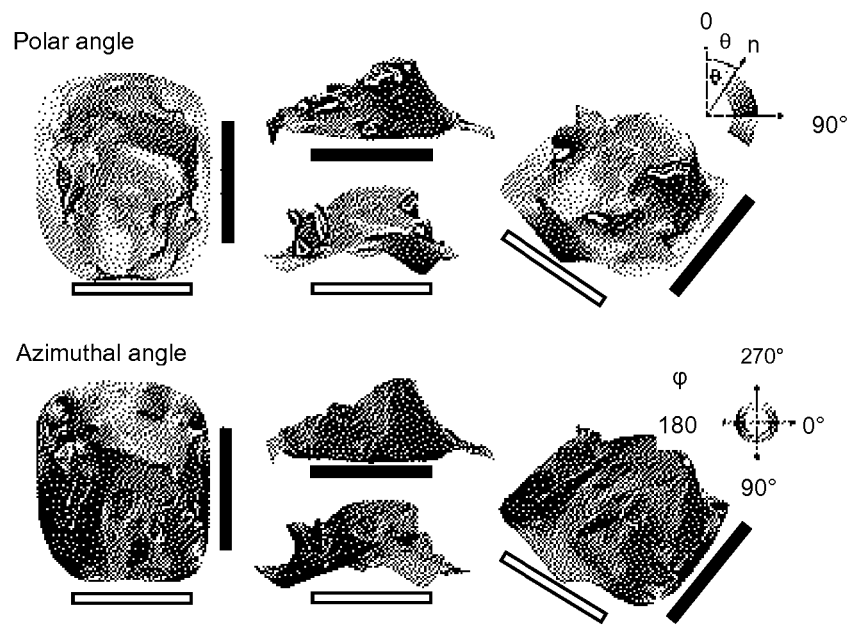
FIG. 11 shows results obtained using an embodiment of the method in accordance with the invention.

The availability of a 3D model from the P3D approach allows for a detailed analysis of the topography of the investigated object. FIG. 11 comprises an analysis of the polar and azimuthal contributions of the surface normals of each cell in the polygonal mesh. FIG. 11 illustrates color-coded polar (top) and azimuthal angle (bottom) of the surface normals of the model. The polar angle $\theta$ of the surface normal corresponds to the angle of incidence of the primary beam and can be used to evaluate e.g. sputter rates. The azimuthal angle $\varphi$ shows the in-plane component of the surface normal and indicates the emission direction of secondary particles, which can be used to characterize the acceptance angles of the ion extraction system.

The polar angle $\theta$ describes the deviation of the surface normal n with regards to the z-axis (which is parallel to the primary beam axis) and thus the incidence angle of the primary beam with respect to the cell. A darker shade of gray indicates a more grazing incidence, while a light shade highlights regions where the local surface normal points towards the −z direction, i.e., the wafer surface.

In ion-beam based techniques like focused ion beam, FIB, machining or SIMS, the sputter yield is a function of the incidence angle, which affects the local sputter rate and secondary ion yield. As the angle can be calculated from the P3D model, it should be possible to post-correct SIMS data for variations in surface tilt of non-flat surfaces.

The bottom part of FIG. 11 addresses the azimuthal component of the cells' surface normal. The azimuthal angle $\varphi$ corresponds to the rotational component in the x-y-plane (i.e., perpendicular to the primary beam axis), with an arbitrary 0°. The azimuthal angle is of some importance for a detection system with a limited acceptance angle. The derived values can also be used for modeling/simulation/post-correction of acquired data. The grayscale-coded models show that the particle features four distinct slopes, with an exception at the center-left position in the on-top graph, which corresponds to the freestanding wall that can be easily identified in, e.g., FIG. 8c/d.

As discussed before, an unexpectedly low ion yield was observed for the top third of the particle as displayed in the on-top view of the $^{115}$In-signal in FIG. 10. The analysis of the polar angle in FIG. 11 for the respective region shows a higher angle of incidence compared to the main slope, which should result in a higher or at least similar secondary ion signal due to an increase in the sputter yield. This is clearly not the case. The azimuthal angle analysis, on the other hand, shows that the two slopes are oriented with a difference in φ of almost 180°. Assuming a limited azimuthal acceptance angle of the spectrometer, this may account for the missing signal.

Figure 12:
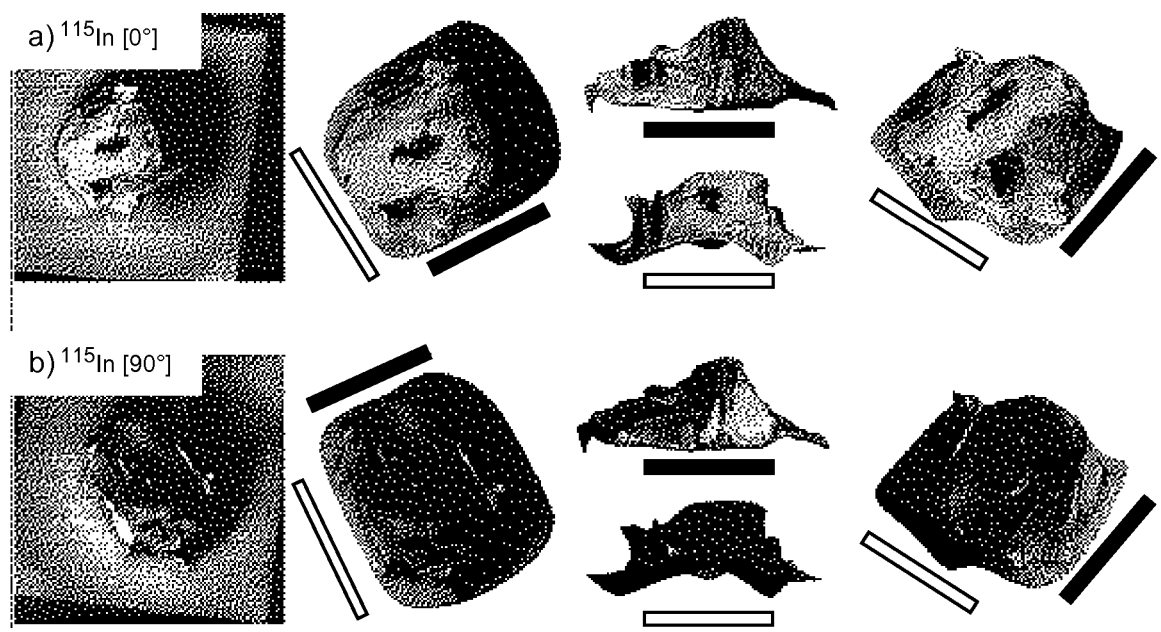
FIG. 12 shows results obtained using an embodiment of the method in accordance with the invention.

The sample was therefore rotated by 90° around the vertical axis and subjected to SIMS analysis for a second time. The results are juxtaposed in FIG. 12. FIG. 12 shows a comparison of the $^{115}$In SIMS intensity observed for the same particle at 0° (a) and after a 90° relative rotation (b). The initial SIMS intensities are plotted on the left and mapped to the P3D-model on the right. Black and white bars indicate the viewing angles of the shaded model. The difference in the Indium signal is attributed to a strong directional component of the acceptance angle of the ion-optical system under the given experimental parameters. Slopes with an azimuthal component towards the lower left of the SIMS map exhibit higher intensities compared to all other directions (c.f., FIG. 11). Note that only the intensities of recorded on the particle are affected, while the surrounding (flat) wafer surfaces exhibit similar intensities. The SIMS intensity map in a) is oriented to match the internal x-y-orientation of the microscope and defined to have a rotation of 0°. The SIMS map in b) was recorded after a clockwise rotation of 90°. The on-top projections of the textured P3D models have been rotated to match the respective SIMS maps, while the side and perspective views remain unchanged.

It is immediately apparent that there is much higher signal intensity for all particle surfaces where the azimuth of the normal is oriented towards the lower left of the SIMS map. The signal levels for the InP-wafer surrounding the particle seem not to be strongly affected by the rotation, except for what could be considered as a shadowing effect on the opposite side of the particle.

This preferential detection angle is most likely related to a limited acceptance angle of the spectrometer. It is unclear at this point whether this is an intrinsic quality of the spectrometer design or caused by the spectrometer alignment during the experiment setup.

Potential Applications

The possibility to generate a three-dimensional model of almost any 3D structure during HIM analysis without the need for sample exchange, ex-situ processing or additional instrumentation opens up a number of potential application both for FIB and SIMS applications.

a) Post-Calibration of 3D-SIMS

Figure 13:
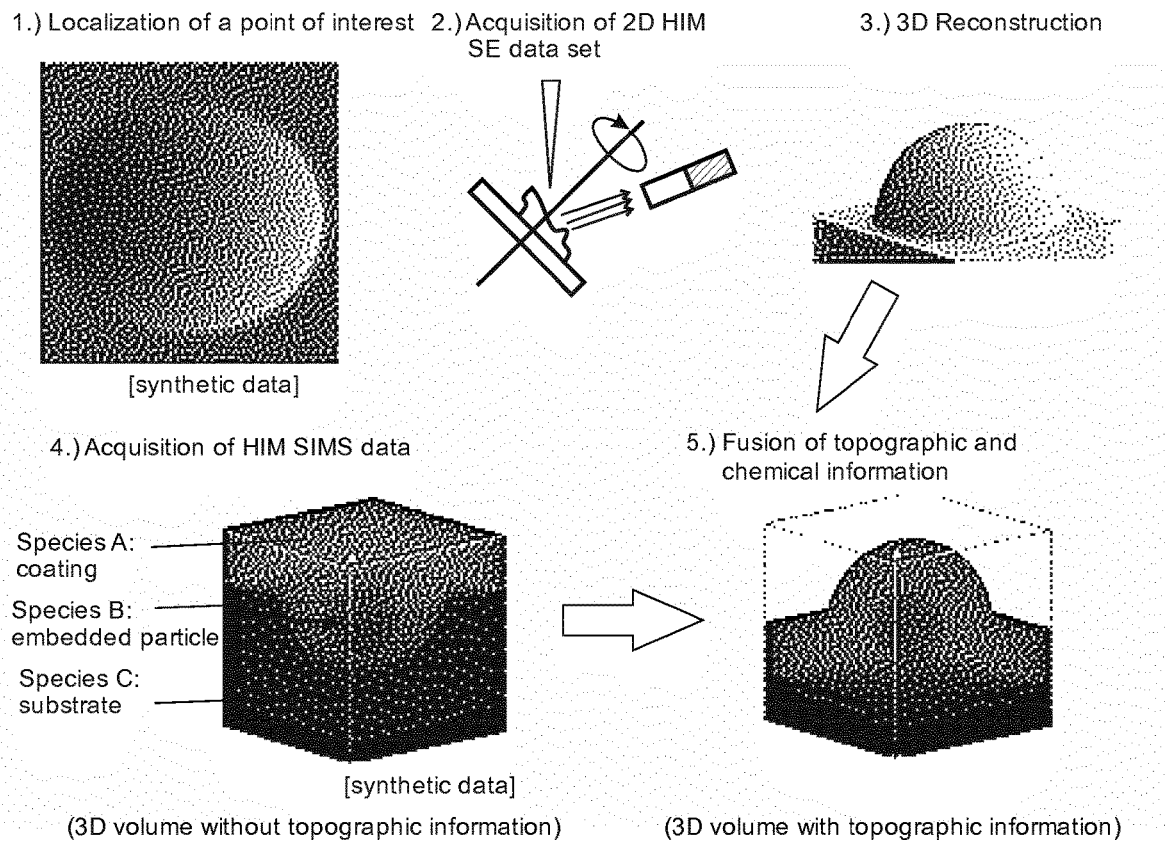
FIG. 13 shows post-calibration of a 3D-SIMS analysis in accordance with embodiments of the invention.

As previously discussed, 3D data in SIMS is typically acquired in the form of a stack of pseudo-2D maps, which yield a 3D volume data set comprised of voxels in a regular lattice. If the surface topography is not explicitly taken into account, the assumption of a flat surface will introduce subsurface deformations in in the volume model (FIG. 13, section 4). Using the P3D method to generate a 3D surface model of the specimen as proposed by aspects of the invention, it becomes possible to post-calibrate the z-coordinates to match the non-flat surface and thus reduce the deformation in subsurface layers, as described in more detail in FIG. 13. FIG. 13 shows the concept of post-calibration of a 3D-SIMS analysis. If a flat surface is assumed for the reconstruction, protrusions or depressions in the surface will incur subsurface deformations (3., 4.). Using the 3D surface model, it becomes possible to correct for the actual surface topography and thus reduce the error in the volume data.

b) Modelling/Simulation of 2D/3D-SIMS

As discussed before, the analysis of the polar and azimuthal angles can be used as the starting point for a complete modelling of the sputtering process and/or image formation of a 2D SIMS map to better understand the as acquired data. Modelling and simulation of full 3D-SIMS data sets can benefit the accuracy of post-calibration.

c) Accurate Layer-by-Layer Analysis and Machining

A 3D surface model generated by the P3D method on the HIM can be used to generate a 3D volume model. The volume model can be sliced into a stack of cross-sectional layers perpendicular to the z-axis, much like a model is sliced for additive manufacturing purposes before being printed in a layer-by-layer fashion.

Figure 14:
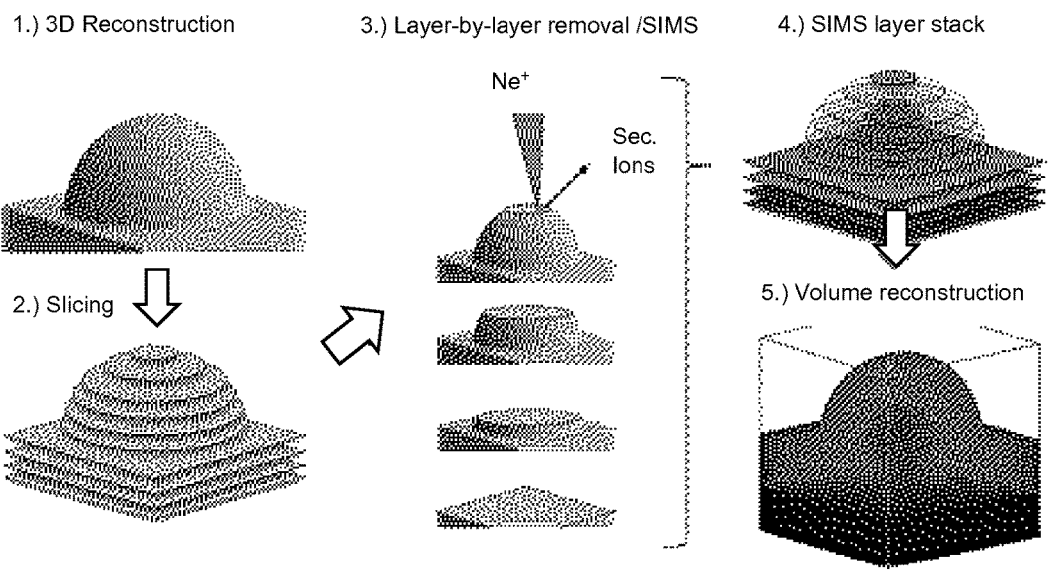
FIG. 14 illustrates model-assisted slicing and layer-by-layer FIB removal or SIMS acquisition and 3D volume reconstruction in accordance with embodiments of the invention.

In a reversal of the 3D-printing process, the structure in question can be decomposed in a layer-by-layer fashion from the top down, so that only the respective layer is removed. For FIB machining, which can be done directly on the HIM, this could be used to remove particles without damaging the surrounding surface in an automated fashion. For SIMS, the same damage-free removal could be achieved with the added benefit that each layer is inherently flat and no post-calibration is required. FIG. 14 illustrates the concept of model-assisted slicing and layer-by-layer FIB removal or SIMS acquisition and 3D volume reconstruction.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A method for joint 3D imaging and chemical analysis of a sample comprising:
 a) obtaining a sequence of two-dimensional images of said sample by a device, the sequence of two-dimensional images are based on secondary electron detection, the images of said sequence being taken from different viewing angles, and combining said two-dimensional images into a three-dimensional representation of the sample;
 b) obtaining a representation of a chemical composition of said sample by the device, wherein obtaining the representation of the chemical composition is performed in-situ with obtaining the sequence of two-dimensional images of said sample, wherein during said secondary ion mass spectrometry analysis step b), the sample is irradiated using a second primary charged particle beam, thereby releasing secondary ions from the sample, and wherein the second primary charged particle beam is an ion beam; and
 c) mapping the representation of the chemical composition and the three-dimensional representation of the sample and recording a result in a memory element.

2. The method according to claim 1,
wherein during said secondary electron imaging step a), the sample is irradiated using a first primary charged particle beam for taking a two-dimensional image, thereby releasing secondary electrons from the sample.

3. The method according to claim 2, wherein the first primary charged particle beam is an ion beam.

4. The method according to claim 3, wherein a first primary ion beam is an $He^+$ beam, and wherein a second primary ion beam is an $Ne^+$ beam.

5. The method according to claim 2, wherein the first primary charged particle beam is an electron beam.

6. The method according to claim 2, wherein the first primary charged particle beam is an electron beam and the second primary charged particle beam is an ion beam.

7. The method according to claim 2, wherein the first primary charged particle beam is an ion beam.

8. The method according to claim 1, wherein during said secondary electron imaging step a), a relative position of said sample with respect to said secondary electron detection is changed.

9. The method according to claim 8, wherein said position is changed by changing an orientation of the sample with respect to the secondary electron detection.

10. The method according to claim 1, wherein step a) is performed prior to step b), or vice-versa.

11. A device for performing joint 3D in-situ imaging and chemical analysis of a sample, the device comprising a memory storing instructions when executed by a processor cause the processor to:
a) obtain a sequence of two-dimensional images of said sample by the device, the sequence of two-dimensional images are based on secondary electron detection, the images of said sequence being taken from different viewing angles, and combine said two-dimensional images into a three-dimensional representation of the sample;
b) obtain a representation of a chemical composition of said sample by the device, wherein the representation of the chemical composition is obtained by in-situ performance with obtaining the sequence of two-dimensional images of said sample, wherein during said secondary ion mass spectrometry analysis step b), the sample is irradiated using a second primary charged particle beam, to release secondary ions from the sample, and wherein the second primary charged particle beam is an ion beam; and
c) map the representation of the chemical composition and the three-dimensional representation of the sample and record a result in a memory element.

12. The device according to claim 11, wherein the device is configured to generate a first primary charged particle beam and a second primary charged particle beam.

13. The device according to claim 12, wherein an ion source is shared and utilized to generate the first primary charged particle beam and the second primary charged particle beam.

14. The device according to claim 13, wherein said ion source comprises a gas field ion source.

15. The device according to claim 11, wherein said sample holder comprises a rotatable stage for rotating the sample with respect to an emission axis utilized during generation of the first primary charged particle beam and the second primary charged particle beam.

* * * * *